United States Patent [19]

Kaburaki et al.

[11] Patent Number: 5,047,286

[45] Date of Patent: Sep. 10, 1991

[54] PRINTING SHEETS

[75] Inventors: Yoshiaki Kaburaki; Junichi Morimoto; Katumitu Tamura; Koichi Tomita, all of Shizuoka, Japan

[73] Assignee: Tomoegawa Paper Co., Tokyo, Japan

[21] Appl. No.: 385,226

[22] Filed: Jul. 25, 1989

[51] Int. Cl.$^5$ ....................... B32B 27/32; B32B 27/00; B41M 1/30

[52] U.S. Cl. ..................................... 428/246; 428/41; 428/341; 428/285; 428/287; 428/702; 428/696; 428/922; 428/514; 428/511; 428/512; 427/407.1; 427/411; 427/412

[58] Field of Search ............... 428/246, 285, 574, 696, 428/287, 702, 908, 922, 511, 512

[56] References Cited

U.S. PATENT DOCUMENTS

| | | | |
|---|---|---|---|
| 4,092,457 | 5/1978 | Fujita et al. | 428/514 |
| 4,603,079 | 7/1986 | Nishizaki et al. | 428/323 |
| 4,701,367 | 10/1987 | Malhotra | 428/216 |
| 4,707,463 | 11/1987 | Ikeda | 503/209 |

FOREIGN PATENT DOCUMENTS

| | | | |
|---|---|---|---|
| 00233703 | 1/1987 | European Pat. Off. . | |
| 3627973 A1 | 2/1988 | Fed. Rep. of Germany . | |
| 0055193 | 3/1987 | Japan | 428/925 |
| 1166066 | 10/1969 | United Kingdom . | |
| 2166689 A | 5/1986 | United Kingdom . | |

*Primary Examiner*—P. C. Sluby
*Attorney, Agent, or Firm*—Darby & Darby

[57] ABSTRACT

Disclosed is a printing sheet comprising (a) a support, and (b) a surface layer provided on at least one side surface of the support, the surface layer containing at least one compound selected from the group consisting of n-butyl (meth)acrylate based polymers, phenyl (meth)acrylate based homopolymer and copolymers, benzyl (meth)acrylate based homopolymers and copolymers, styrene based homopolymers and copolymers, cinnamic acid, and cinnamic acid derivatives. The printing sheets have improved printability.

6 Claims, No Drawings

PRINTING SHEETS

BACKGROUND OF THE INVENTION

This invention relates to printing sheets, more particularly, those for use in offset printing.

Recently, there has been increasing demands for printing various thermoplastic resin films represented by polyester films according as diversified development of printing. It has also been desired to print on special sheet-form materials such as metal foils, metal-deposited paper, metal fiber sheets, ceramics sheets and the like. Generally, these sheet-form materials have been printed by offset printing, gravure printing, flexographic printing, screen printing, relief printing, or the like printing methods. Among the conventional printing methods, offset printing has attracted much attention since it is easy to make plates, it can be performed at low costs, it provides more beautiful printings as compared other printing methods, it can be performed economically when only a small number of sheets are to be printed, and for some other reasons. Development of printing sheets suitable for offset printing has been made accordingly.

The properties that are required for the printing sheets for use in offset printing include sheet running property, anti-blocking property, anti-setoff property, ink-drying property, ink adhesion property, anti-static property, etc. These properties are not satisfied by sheets themselves; the printing sheets are usually subjected to surface treatment before they can be useful as printing sheets suitable for offset printing. For example, polyester films are coated with a coating material containing an inorganic pigment in order to improve ink-drying property, they are subjected to corona discharge treatment in order to improve ink-adhesion property, or the films themselves are molded from resins which comprise copolymers of the ester monomer with other polar monomers or those which are blends of the polyester with other resins composed of polar monomers. For preventing static charges, countermeasure is taken, for example, by kneading an anti-static agent in the resin before molding into sheets or coating the anti-static agent on the surface of the resin sheets.

However, notwithstanding the above-described treatments, the requirements for printing sheets for use in offset printing are not always satisfied completely from the practical viewpoint. Furthermore, it has heretofore been performed to bond an undertaper to the rear side of the printing sheet to obtain printing sheets for use in offset printing in order to overcome disadvantages of the conventional printing sheets such as poor sheet running property, poor anti-blocking property, poor anti-offset of ink, and the like. In this case, however, other problems arise from the viewpoints of operability and economics in that additional steps are necessitated such as a step of bonding in which the undertaper is bonded to the printing sheets, and a step of stripping in which the undertaper is stripped off from the printing sheets after the printing is over, and also that additional cost for the undertaper is incurred.

In addition, as the result of recent development of ultraviolet-curing ink (hereafter, sometimes referred to as "UV ink", for brevity) which dries in a very short time and particularly advantageous in the operability, printing methods using UV ink has prevailed widely. However, when the above-described sheet-form materials are printed with UV ink, no satisfactory adhesion is obtained between the UV ink after curing and the surface of the sheet material, resulting in peeling off of the printed layer. Therefore, it has been desired to develop printing sheets having improved adhesion between the surface thereof and the ink to be applied.

SUMMARY OF THE INVENTION

Therefore, an object of this invention is to provide printing sheets which have all the requirements necessary for printing sheets and also have excellent printing properties, and which can avoid bonding of an undertaper thereto.

Another object of this invention is to provide printing sheets which have excellent adhesion to UV ink.

As the result of extensive research on the requirements to be satisfied by printing sheets, this invention has now been completed, which provides a printing sheet comprising:

(a) a support, and (b) a surface layer provided on at least one side surface of said support, said surface layer containing at least one compound selected from the group consisting of n-butyl (meth)acrylate based polymers, phenyl (meth)acrylate based homopolymers and copolymers, benzyl (meth)acrylate based homopolymers and copolymers, styrene based homopolymers and copolymers, cinnamic acid, and cinnamic acid derivatives.

In another aspect, this invention provides a printing sheet comprising (a) a support, and (b) a surface layer provided on at least one side surface of said support, said surface layer comprising (i) at least one resin selected from the group consisting of phenyl (meth)acrylate based homopolymers and copolymers, benzyl (meth)acrylate based homopolymers and copolymers, and styrene based homopolymers and copolymers, and (ii) at least one compound selected from the group consisting of cinnamic acid and cinnamic acid derivatives.

The printing sheets of this invention having a specified surface layer exhibit excellent printability such as reproducibility of letters or images, ink drying property, sheet running property and anti-ink offset and can be used advantageously in various printing methods. Moreover, the printing sheets of this invention are excellent in the ink drying property particularly for oxidation polymerized type ink and therefore they can avoid attachment of undertapers which would otherwise be required for conventional printing sheets for offset printing. Furthermore, the printing sheets of this invention has excellent adhesion to UV curing type ink and makes it possible to apply UV curing ink to sheet-form materials other than paper such as plastic films when offset printing is used.

DETAILED DESCRIPTION OF THE INVENTION

The term "(meth)acrylate" as used herein refers to methacrylate or acrylate.

The n-butyl (meth)acrylate based polymers which can be used in the surface layer of the printing sheet of this invention include n-butyl (meth)acrylate based resins or oligomers of n-butyl (meth)acrylate. As the n-butyl (meth)acrylate based resin, there can be used copolymers of n-butyl (meth)acrylate with other monomers including vinyl monomers such as acrylate based monomers, methacrylate based monomers, and styrene based monomers as well as homopolymers of n-butyl (meth)acrylate. In the case of the copolymers, the content of n-butyl (meth)acrylate to be copolymerized is not smaller than 30% by weight based on the total weight of the monomers used. The n-butyl (meth)acrylate based oligomers may be homopolymeric oligomers of n-butyl (meth)acrylate or copolymeric oligomers of n-butyl (meth)acrylate with other vinyl monomer. Examples of the vinyl monomers copolymerizable with n-butyl (meth)acrylate which can be used in the preparation of the copolymeric oligomers include methyl (meth)acrylate, (meth)acrylates other than n-butyl methacrylate, acrylates, styrene and butadiene. The proportion of n-butyl (meth)acrylate to the copolymerizable monomer is preferably at least 1:1 by weight. The term "oligomers" as used herein refers to those having average molecular weight of not greater than 5,000, and those having average molecular weight of from 1,000 to 5,000 can be used advantageously.

In this invention, it is preferred that the n-butyl (meth)acrylate based polymers are contained in the surface layer in amounts of from 30 to 100% by weight based on the total weight of the materials constituting the surface layer. When the oligomers are used as the n-butyl (meth)acrylate copolymer, it is preferred that they are contained in the surface layer in amounts of from 30 to 75% by weight, and preferably from 50 to 75% by weight based on the total weight of the surface layer. When the content of the oligomer is greater than 75% by weight, blocking tends to occur upon loading the sheets. On the other hand, the ink drying property is poor with the oligomer in amounts smaller than 30% by weight.

Examples of the cinnamic acid derivatives contained in the surface layer of the printing sheets of this invention include various cinnamic acid derivatives such as cinnamates, for example, ethyl cinnamate and amides of cinnamic acid, for example, amide cinnamate. The homopolymers and copolymers of phenyl (meth)acrylate based monomers, benzyl (meth)acrylate based monomers, and styrene based monomers include respective homopolymers of phenyl (meth)acrylate, benzyl (meth)acrylate and styrene, and copolymers comprising at least one of the monomer components, e.g., copolymers composed of two or three of different kinds of monomers from the above-described monomers, copolymers of the monomer with other monomer copolymerizable therewith such as other methacrylate, acrylate, butadiene, etc. One or more of the polymers can be used in admixture. The term "styrene" as used herein includes various derivatives of styrene such as α-methylstyrene, vinyltoluene, etc. These compounds are each suitable for printing using particularly UV ink. These compounds have to be contained in the surface layer in amounts of not smaller than 0.5% by weight, and particularly not smaller than 5% by weight when they are contained in the form of polymers.

The thickness of the surface layer on the printing sheets of this invention is preferably from about 1 to 10 μm. For forming the surface layer on the support in this invention, the respective compounds described above, if desired, together with a resin for coating, are dissolved or dispersed in a solvent or water to prepare a coating liquid, which is then coated by conventional methods such as a roll coating method, a blade coating method, a spray coating method, an air-knife coating method, a rod bar coating method and the like, followed by drying. Alternatively, a uniform mixture of the raw materials for forming the surface layer described above is applied to the support by a hot melt coating method and a laminating method, etc. As the resin for coating, there can be used resins commonly used in the coatings or laminates. Suitable examples of such resin include polyester resins, acrylate resins, methacrylate resins, vinyl chloride resins, vinyl acetate resins, and various homopolymer or copolymer resins.

If desired, various additives can be added to the surface layer in order to improve anti-blocking property, sheet running property, anti-static property, etc. Examples of the additives which can be used include pigments such as silica, clay, talc, diatomaceous earth, calcium carbonate, calcium sulfate, barium sulfate, aluminum silicate, synthetic zeolite, alumina, zinc oxide, lithopon and satin white, cationic, anionic and nonionic anti-static agents, and the like.

The surface layer of the printing sheets of this invention generally has above-described construction, and the surface layer containing as a major component a resin selected from the group consisting of the homopolymers and copolymers of the phenyl (meth)acrylate based monomers, benzyl (meth)acrylate based monomers, and styrene based monomers, and in addition, cinnamic acid and/or its derivatives, has particularly improved adhesion to UV ink and therefore is advantageous.

Examples of the support which can be used in this invention include paper, synthetic paper, woven fabric, nonwoven fabric, thermoplastic resin sheets (films), ceramic sheets, metal fiber sheets, metal deposited sheets (films), metal foils, metal plates, etc. and multi-layered composite sheets constructed by a combination of these materials. The shape of the support is not limited particularly but it may be in any shape or form such as film, sheet, plate and the like if it is suited for its application to printing machines.

The printing sheets of this invention, which is provided with the above-described surface layer on at least one side surface of the support, have not only good sheet running property and anti-blocking property but also excellent ink-drying property. Further improvement in the ink-drying property can be obtained by adding special metal or metal compound to the surface layer.

The special metal or metal compound which can be used in this invention include simple metals such as aluminum, vanadium, chromium, manganese, iron, cobalt, nickel, copper, zinc, tin and lead, and various compounds of these metals. Of these, cobalt, manganese and lead are preferred. Specific examples thereof include fine powders of the respective metal elements described above, oxides such as manganese dioxide, iron (II) oxide, iron (III) oxide and lead (II) oxide, sulfides such as iron (II) sulfide and lead (II) sulfide, hydroxides such as iron (III) hydroxide and aluminum (III) hydroxide, halides such as iron (II) chloride, cobalt (II) chloride and lead (II) chloride, or various metal salts such as sulfates, nitrates and carbonates of the above-specified metals. In addition, chromates, dichromates, permanganates and the like can also be used in this invention. The metals or metal compounds can be contained in the surface layer in amounts of not smaller than 0.01% by weight, preferably from 0.05 to 10% by weight to obtain desired effects. Two or more of the metals and metal compounds may be used in admixture, if desired.

In the printing sheets of this invention, the anti-static agent may be added to the surface layer as described above to obtain anti-static property. Instead, an anti-static layer can be provided between the support and the surface layer to further improve the anti-static property of the printing sheets. The anti-static layer may be constructed by any material as far as the layer serves as a low resistance layer having a surface resistivity of not higher than $10^{12}$ ohm/cm$^2$. For example, anti-static agents such as phosphate esters, quaternary ammonium salts, metal materials such as Al, Cu, Fe, etc., conductive materials containing carbon black, and the like can be used.

To form the anti-static layer, various methods can be used, for example, a coating material containing an anti-static agent can be coated on the support. When metals and other conductive materials are used, sheets or foils of a conductive material are laminated on the support. Alternatively, it is also possible to deposit a metal material such as aluminum on the support. The thickness of the anti-static layer may vary depending on the kind of the material used but usually it is preferred to set up in the range of from 1 to 10 μm.

Moreover, an adhesive layer may be provided on the rear side surface (i.e., on the surface on which the surface layer is not provided) of the support using a commonly used adhesive. Furthermore, a releasing film or sheet having a releasing property can be laminated on the adhesive layer, if desired. Thus, the printing sheets of this invention can be used as an adhesive sheet or label which can be tacked at will. This construction ensures wider application of the printing sheets of this invention.

The printing sheets of this invention are particularly suited for offset printing but they also show good printability when used in other printing methods such as gravure printing, flexographic printing, screen printing, relief printing, etc.

EXAMPLES

This invention will be described in greater detail with reference to the following examples and comparative examples which are not construed as limiting this invention in any way.

In the examples and comparative examples, all parts are by weight unless otherwise indicated specifically.

EXAMPLE 1

Polyethylene terephthalate film of 100 μm in thickness was used as a support, and a surface layer of 3 μm in thickness was formed on the support by coating a coating liquid for surface layer having the composition set forth below to form a printing sheet of this invention.

| | |
|---|---|
| n-Butyl methacrylate resin (M.W.: about 180,000) | 20 parts |
| Toluene | 80 parts |

EXAMPLE 2

A printing sheet was prepared in the same manner as in Example 1 except that the coating liquid for surface layer was replaced by the following.

| | |
|---|---|
| Acrylic resin (Thermolack M-2000, produced by Soken Kagaku Co., Ltd.) | 10 parts |
| n-Butyl methacrylate oligomer (M.W.: about 1,000) | 10 parts |
| Toluene | 10 parts |

EXAMPLE 3

A printing sheet was prepared in the same manner as in Example 1 except that the coating liquid for surface layer was replaced by the following.

| | |
|---|---|
| Acrylic resin (Thermolack M-2000, produced by Soken Kagaku Co., Ltd.) | 10 parts |
| n-Butyl methacrylate/methyl methacrylate cooligomer (1:1) (M.W.: about 1,000) | 20 parts |
| Toluene | 10 parts |

EXAMPLE 4

A printing sheet was prepared in the same manner as in Example 1 except that the coating liquid for surface layer was replaced by the following.

| | |
|---|---|
| n-Butyl methacrylate resin (M.W.: about 90,000) | 16 parts |
| Methyl methacrylate resin | 4 parts |
| Silica (FINESIL X-37, Tokuyama Soda Co., Ltd.) | 0.1 part |
| Sodium dodecyl phosphate | 0.7 part |
| Toluene | 80 parts |

EXAMPLE 5

A printing sheet was prepared in the same manner as in Example 1 except that a polyethylene terephthalate film of 100 μm in thickness on which aluminum had been deposited was used as a support.

EXAMPLE 6

A printing sheet was prepared in the same manner as in Example 1 except that the coating liquid for surface layer was replaced by the following.

| | |
|---|---|
| n-Butyl methacrylate resin (M.W.: 90,000, solid content: 40%) | 50 parts |
| Fine powder of cobalt | 0.02 part |
| Solvent (toluene) | 50 parts |

EXAMPLE 7

A printing sheet was prepared in the same manner as in Example 1 except that the coating liquid for surface layer was replaced by the following.

| | |
|---|---|
| n-Butyl methacrylate resin (M.W.: 180,000, Solid content: 40%) | 50 parts |
| Cobalt (II) chloride | 0.02 part |
| Solvent (toluene) | 50 parts |

EXAMPLE 8

A printing sheet was prepared in the same manner as in Example 1 except that the coating liquid for surface layer was replaced by the following.

| | |
|---|---|
| n-Butyl methacrylate oligomer (M.W.: about 1,000) | 50 parts |
| Acrylic resin (Thermolack M-2000, produced by Soken Kagaku Co., Ltd.) | 50 parts |
| Manganese sulfate | 0.01 part |
| Solvent (toluene) | 50 parts |

EXAMPLE 9

A printing sheet was prepared in the same manner as in Example 1 except that the coating liquid for surface layer was replaced by the following.

| | |
|---|---|
| n-Butyl methacrylate resin (M.W.: 90,000, solid content: 40%) | 50 parts |
| Manganese dioxide | 0.01 part |
| Solvent (toluene) | 50 parts |

EXAMPLE 10 to 16

Printing sheets were prepared in the same manner as in Example 6 except that the metals or metal compounds shown in Table 1 were used in place of the fine powder of cobalt in the coating liquid for surface layer.

TABLE 1

| Example | Metal or Metal Compound |
|---|---|
| 10 | Manganese Borate |
| 11 | Vanadium Powder |
| 12 | Chrome Green |
| 13 | Cobalt Sulfate |
| 14 | Tin Powder |
| 15 | Chrome Yellow |
| 16 | Lead Borate |

EXAMPLE 17

Polyethylene terephthalate film of 100 μm in thickness was used as a support, and an anti-static layer of 1 μm in thickness was formed on the support by coating an anti-static coating liquid having the composition set forth below.

| | |
|---|---|
| Acrylic resin based anti-static agent (COLCOAT NR3121, Colcoat Co., Ltd.) | 10 parts |
| Methanol | 30 parts |

Then, the same coating liquid for surface layer as used in Example 1 was coated on the thus-formed anti-static layer to form a surface layer.

EXAMPLE 18

A printing sheet of this invention was prepared in the same manner as in Example 17 except that the coating liquid for anti-static layer was prepared by using a polysilioxane based anti-static agent (ANTISTAT CS3900, Toshiba Chemical Co., Ltd.).

COMPARATIVE EXAMPLE 1

A printing sheet for comparison was prepared in the same manner as in Example 1 except that the coating liquid for surface layer was replaced by the following.

| | |
|---|---|
| Polyester resin (Vylon #200, Toyobo Co., Ltd., solid content: 40%) | 50 parts |
| Solvent (toluene) | 50 parts |

COMPARATIVE EXAMPLE 2

A printing sheet for comparison was prepared in the same manner as in Example 1 except that the coating liquid for surface layer was replaced by the following.

| | |
|---|---|
| Methyl methacrylate resin (M-2000, Soken Kagaku Co., Ltd., solid content: 40%) | 50 parts |
| Solvent (toluene) | 50 parts |

COMPARATIVE EXAMPLE 3

A printing sheet for comparison was prepared in the same manner as in Example 1 except that the coating liquid for surface layer was replaced by the following.

| | |
|---|---|
| i-Butyl methacrylate resin | 20 parts |
| Solvent (toluene) | 80 parts |

COMPARATIVE EXAMPLE 4

A printing sheet for comparison was prepared in the same manner as in Example 1 except that the coating liquid for surface layer was replaced by the following.

| | |
|---|---|
| Ethyl methacrylate resin | 20 parts |
| Solvent (toluene) | 80 parts |

COMPARATIVE EXAMPLE 5

A polyethylene terephthalate film of 100 μm in thickness was used as it is as a support without providing a surface layer to prepare a printing sheet for comparison.

PRINTABILITY TEST

The printing sheets of Examples 1 to 18 and Comparative Examples 1 to 5 were subjected to printability tests performed using IGT printability tester manufactured by Kumagai Riki Co., Ltd. and TSP 300 Black produced by Toyo Ink Mfg. Co., Ltd. as ink. The results obtained are shown in Table 2.

TABLE 2

| Sample | Reproducibility | Ink Drying Property | Ink Setoff | Sheet Running Property |
|---|---|---|---|---|
| 1 | Good | Good | Fair | Good |
| 2 | Good | Good | Fair | Good |
| 3 | Good | Good | Fair | Good |
| 4 | Good | Good | Fair | Good |
| 5 | Good | Good | Fair | Good |
| 6 | Good | Excellent | Good | Good |
| 7 | Good | Excellent | Good | Good |
| 8 | Good | Excellent | Good | Good |
| 9 | Good | Excellent | Good | Good |
| 10 | Good | Excellent | Good | Good |
| 11 | Good | Excellent | Good | Good |
| 12 | Good | Excellent | Good | Good |
| 13 | Good | Excellent | Good | Good |
| 14 | Good | Excellent | Good | Good |
| 15 | Good | Excellent | Good | Good |
| 16 | Good | Excellent | Good | Good |
| 17 | Good | Good | Fair | Excellent |
| 18 | Good | Good | Fair | Excellent |
| C.E. 1 | Good | Poor | Poor | Fair |
| 2 | Good | Poor | Poor | Poor |

TABLE 2-continued

| Sample | Reproducibility | Ink Drying Property | Ink Setoff | Sheet Running Property |
|---|---|---|---|---|
| 3 | Good | Poor | Poor | Poor |
| 4 | Good | Fair | Fair | Poor |
| 5 | Good | Poor | Poor | Fair |

Notes:

(1) Reproducibility: Judged by visual observation.

"Good" indicates a state in which scratching or thinning of ink seldom occurs and the reproducibility of letters or images is acceptable and "poor" indicates a state in which the reproducibility is unacceptable.

(2) Ink drying property: 1 hour after printing printed sheet was rubbed with finger, and judged by visual observation.

"Excellent" indicates a state in which no stain was observed on the finger. "Good" means a state in which the finger was stained very slightly. "Fair" shows a state in which ink adhered to the finger notably. "Poor" indicates a state in which ink adhered to the finger considerably and the surface of the printed matter was stained.

(3) Ink Setoff: Immediately after printing, an unused printing sheet was superimposed on the printed sheet and after the ink dried, transfer of ink to the rear surface of the superimposed printing sheet was judged by visual observation.

"Good" indicates a state in which there was no problem. "Fair" indicates a state in which slight ink setoff was observed. "Poor" stands for a state in which ink setoff was observed clearly, which was practically unacceptable.

(4) Sheet running property: Continuous printing with a printing machine was conducted.

"Excellent" means a state in which no obstruction (such as double sheet feeding, jamming, unalignment of printing sheets at the mounting portion, etc.) was observed. "Good" indicates a state in which obstruction was observed only a little. "Fair" indicates a state in which obstruction involving the stoppage of the printing machine was observed. "Poor" means a state in which obstruction occurred frequently and practically unacceptable.

Table 2 clearly shows that the printing sheets of this invention are superior in printability to those of comparison.

EXAMPLE 19

On a polyethylene terephthalate film (PET 100G, Fuji Photo Film Co., Ltd.) of 100 μm in thickness was coated with a coating liquid for surface layer having the composition set forth below to a thickness of 3 μm to form a surface layer, followed by drying to obtain a printing sheet of this invention.

| | |
|---|---|
| Methyl methacrylate/styrene (1:1) copolymer (M.W.: about 30,000, solid content: 40%) | 10 parts |
| Toluene | 10 parts |

EXAMPLE 20

A printing sheet was prepared in the same manner as in Example 19 except that the coating liquid for surface layer was replaced by the following.

| | |
|---|---|
| Methyl methacrylate/phenyl methacrylate (1:1) copolymer (M.W.: about 30,000, solid content: 40%) | 10 parts |
| Toluene | 10 parts |

EXAMPLE 21

A printing sheet was prepared in the same manner as in Example 19 except that the coating liquid for surface layer was replaced by the following.

| | |
|---|---|
| Methyl methacrylate/benzyl methacrylate (1:1) copolymer (M.W.: about 30,000, solid content: 40%) | 10 parts |
| Toluene | 10 parts |

EXAMPLE 22

A printing sheet was prepared in the same manner as in Example 19 except that the coating liquid for surface layer was replaced by the following.

| | |
|---|---|
| Methyl methacrylate resin (M-2000, Soken Kagaku Co., Ltd., solid content: 10%) | 10 parts |
| Cinnamic acid | 0.05 part |
| Toluene | 10 parts |

EXAMPLE 23

A printing sheet was prepared in the same manner as in Example 19 except that the coating liquid for surface layer was replaced by the following.

| | |
|---|---|
| Polyester based resin (Vylon #200, Toyobo Co., Ltd., solid content: 40%) | 10 parts |
| Cinnamic acid | 0.05 part |
| Toluene | 40 parts |

EXAMPLE 24

A printing sheet was prepared in the same manner as in Example 19 except that the coating liquid for surface layer was replaced by the following.

| | |
|---|---|
| Polyphenyl methacrylate (M.W.: about 15,000, solid content: 40%) | 10 parts |
| Toluene | 10 parts |

EXAMPLE 25

A printing sheet was prepared in the same manner as in Example 19 except that the coating liquid for surface layer was replaced by the following.

| | |
|---|---|
| Polybenzyl methacrylate (M.W.: about 15,000, solid content: 40%) | 10 parts |
| Toluene | 10 parts |

EXAMPLE 26

A printing sheet was prepared in the same manner as in Example 19 except that the coating liquid for surface layer was replaced by the following.

| | |
|---|---|
| Polyphenyl methacrylate (M.W.: about 15,000, solid content: 40%) | 10 parts |
| Cinnamic acid | 0.05 part |
| Toluene/MEK = 1/1 | 10 parts |

EXAMPLE 27

A printing sheet was prepared in the same manner as in Example 19 except that the coating liquid for surface layer was replaced by the following.

| | |
|---|---|
| Polybenzyl methacrylate (M.W.: about 15,000, solid content: 40%) | 10 parts |
| Cinnamic acid | 0.05 part |
| Toluene/MEK = 1/1 | 10 parts |

EXAMPLE 28

A printing sheet was prepared in the same manner as in Example 19 except that the coating liquid for surface layer was replaced by the following.

| | |
|---|---|
| Methyl methacrylate/styrene (1:1) copolymer (M.W.: about 30,000, solid content: 40%) | 10 parts |
| Cinnamic acid | 0.05 part |
| Silica (FINESIL X37, Tokuyama Soda Co., Ltd.) | 0.01 part |
| Toluene | 10 parts |

COMPARATIVE EXAMPLE 6

The same polyethylene terephthalate film as used in Example 19 as a support was used as it is as a printing sheet for comparison.

COMPARATIVE EXAMPLE 7

A printing sheet for comparison was prepared in the same manner as in Example 19 except that the coating liquid for surface layer was replaced by the following.

| | |
|---|---|
| Methyl methacrylate resin (M-2000, Soken Kagaku Co., Ltd., solid content: 40%) | 10 parts |
| Toluene | 10 parts |

PRINTABILITY TEST

The printing sheets obtained in Examples 19 to 28 and Comparative Examples 6 and 7 were printed using IGT printability tester manufactured by Kumagai Riki Co., Ltd. and UV curing ink (FLASH DRY Kon-ai XG, produced by Toyo Ink Mfg. Co., Ltd) as ink. Then, the ink was cured by irradiating UV light using three 5.6 kw UV lamps at a distance of 14 cm for 3 seconds. The reproducibility and adhesion properties were evaluated. The results obtained are shown in Table 3.

TABLE 3

| Example | Repro-ducibility | Ink Adhesion Nail | Ink Adhesion Tape |
|---|---|---|---|
| 19 | Good | Good | Fair |
| 20 | Good | Good | Fair |
| 21 | Good | Good | Fair |
| 22 | Good | Good | Fair |
| 23 | Good | Good | Fair |
| 24 | Good | Good | Fair |
| 25 | Good | Good | Fair |
| 26 | Good | Good | Good |
| 27 | Good | Good | Good |
| 28 | Good | Good | Good |
| C.Ex. 6 | Good | Poor | Poor |
| C.Ex. 7 | Good | Fair | Poor |

Notes:

(i) Reproducibility: Judged by visual observation. "Good" indicates a state in which scratching or thinning of ink seldom occurs and the reproducibility of letters or images is acceptable and "poor" indicates a state in which the reproducibility is unacceptable.

(ii) Ink Adhesion (Nail): The printed portions were scratched with nail.

"Good" indicates a state in which substantially no ink was removed. "Fair" indicates a state in which a little ink was removed. "Poor" stands for a state in which ink was removed readily.

(iii) Ink Adhesion (Tape): An adhesive regenerated cellulose (Cellophane ®) tape was affixed to the printed portion of the printing sheet and peeled off quickly. "Good" indicates a state in which substantially no ink was removed. "Fair" indicates a state in which a small amount of ink was removed. "Poor" means a state in which a considerable amount of ink was removed.

Table 3 clearly shows that the printing sheets of this invention are superior in the ink adhesion property to those of comparison.

OPERATIONAL SUITABILITY TEST

The printing sheets obtained in Example 19 to 28 were subjected to operational suitability tests using an offset printing machine (HEIDERBERG MO). After continuous printing of 10,000 sheets, practically no problem was observed in the sheet running property, reproducibility, ink adhesion and the like.

As described above, the printing sheets of this invention are excellent also in UV ink adhesion and exhibit good printability.

While the emobodiments of the present invention, as herein disclosed, constitute a preferred form, it is to be understood that other forms might be adopted.

What is claimed is:

1. A printing sheet comprising (a) a support, (b) a surface layer provided on at least one side surface of said support, said surface layer containing at least one polymeric compound selected from the group consisting of n-butyl (meth) acrylate based polymers, phenyl (meth)acrylate based homopolymer and copolymers, benzyl (meth)acrylate based homopolymers and copolymers, and a non-polymeric compound selected from the group consisting of cinnamic acid, and cinnamic acid derivatives, and (c) said surface layer having at least one member selected from the group consisting of manganese, cobalt, and lead and compounds thereof.

2. A sheet for printing comprising (a) a support, and (b) a surface layer provided on at least one side surface of said support, said surface layer comprising (i) at least one resin selected from the group consisting of phenyl (meth)acrylate based homopolymers and copolymers, benzyl (meth)acrylate based homopolymers and copolymers, and (ii) at least one compound selected from the group consisting of cinnamic acid and cinnamic acid derivatives.

3. A sheet for printing as claimed in claim 2, wherein said surface layer contains at least one member selected from the group consisting of aluminum, vanadium, chromium, manganese, iron, cobalt, nickel, copper, zinc, tin and lead and compounds thereof.

4. A sheet for printing as claimed in claim 1, wherein said sheet further comprises an anti-static layer provided between said support and said surface layer.

5. A sheet for printing as claimed in claim 2, wherein said sheet further comprises an anti-static layer provided between said support and said surface layer.

6. A sheet for printing as claimed in claim 3, wherein said sheet further comprises an anti-static layer provided between said support and said surface layer.

* * * * *

UNITED STATES PATENT AND TRADEMARK OFFICE
CERTIFICATE OF CORRECTION

PATENT NO. : 5,047,286

DATED : September 10, 1991

INVENTOR(S) : Yoshiaki Kaburaki; Junichi Morimoto; Katumitu Tamura; Koichi Tomita It is certified that error appears in the above—identified patent and that said Letters Patent is hereby corrected as shown below:

Title page, item [73], delete "Tomoegawa Paper Co." and substitute therefor

-- Tomoegawa Paper Co., Ltd. --

Signed and Sealed this

Thirtieth Day of March, 1993

Attest:

STEPHEN G. KUNIN

*Attesting Officer* *Acting Commissioner of Patents and Trademarks*